Aug. 6, 1946.  J. E. CONLEY  2,405,407
RAILWAY FROG
Filed Aug. 13, 1941   3 Sheets-Sheet 1
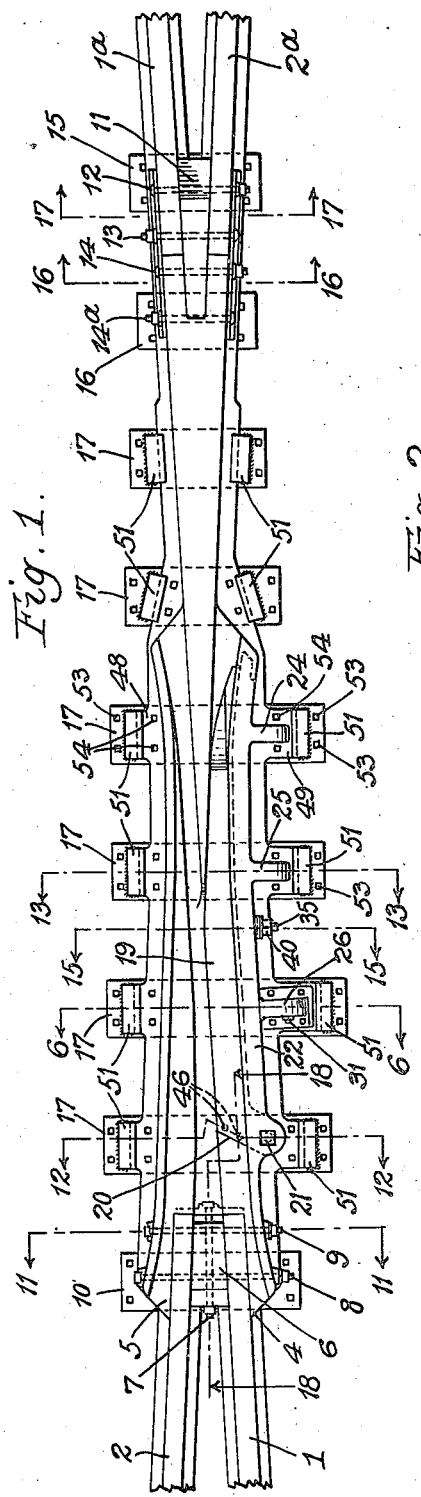
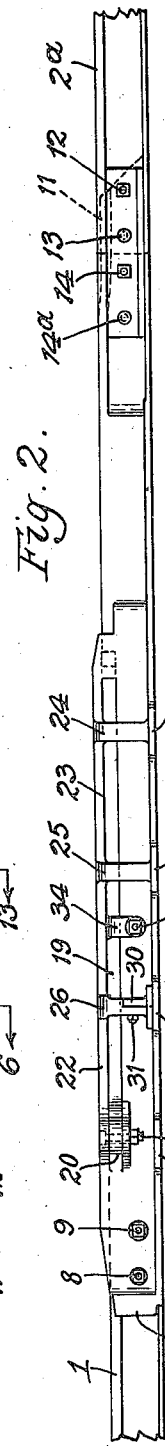
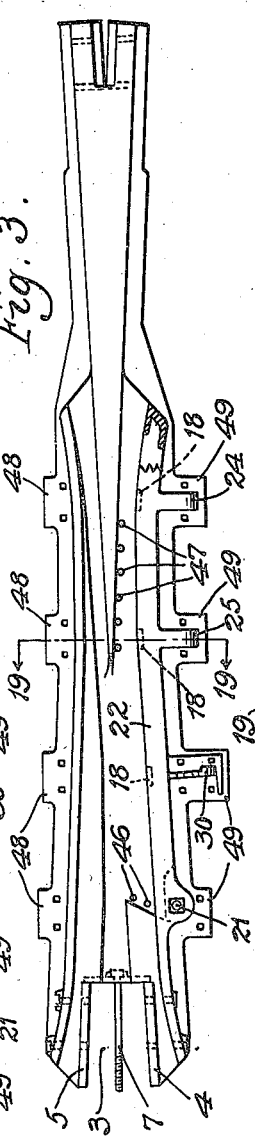
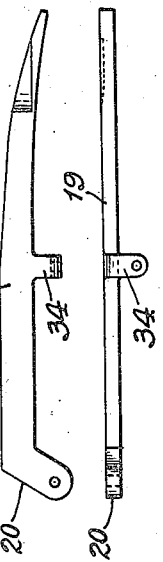
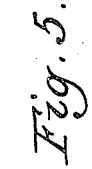
Inventor.
John E. Conley.
by Parker & Carter
Attorneys.

Aug. 6, 1946.                J. E. CONLEY                2,405,407
                             RAILWAY FROG
                   Filed Aug. 13, 1941        3 Sheets-Sheet 2
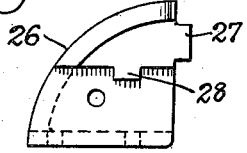
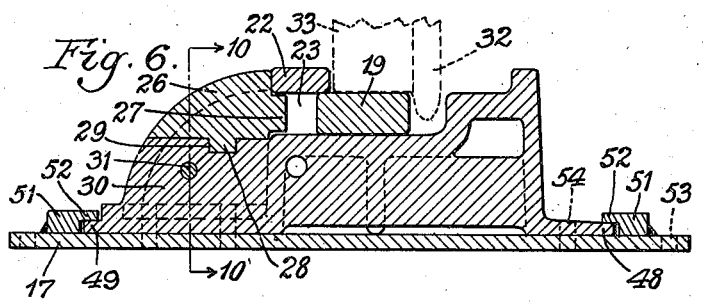
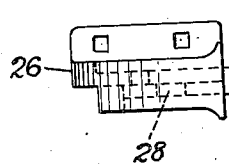
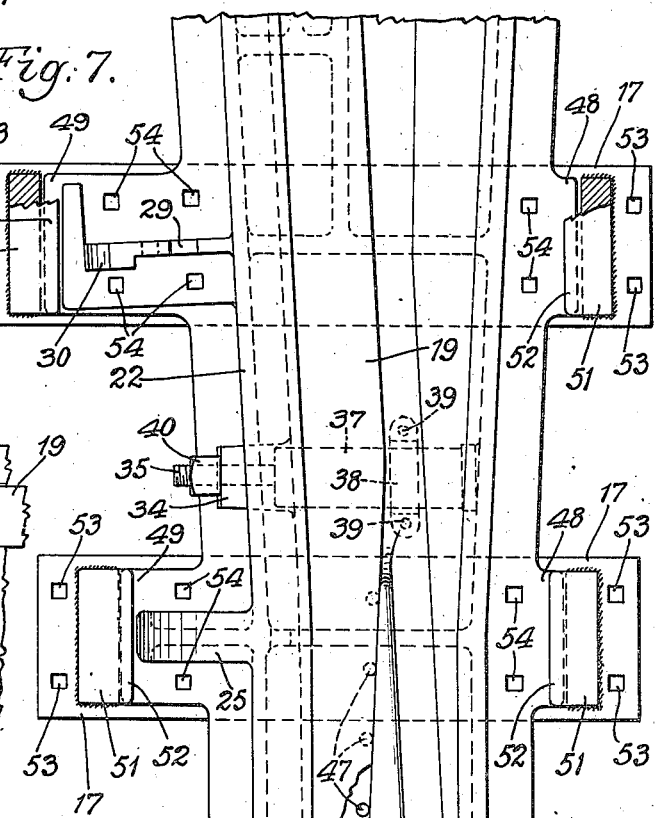
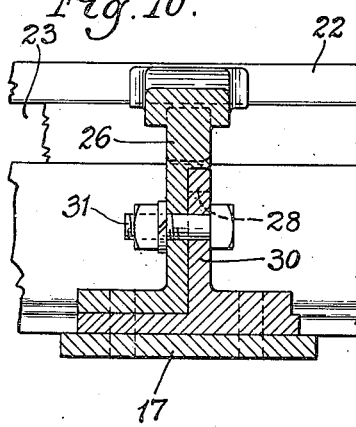
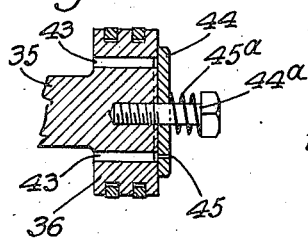
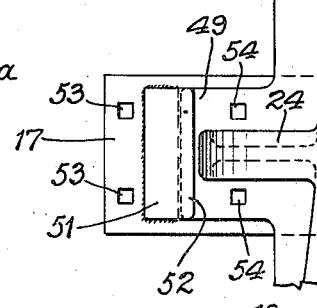
Inventor.
John E. Conley.
by Parker & Carter
Attorneys.

Aug. 6, 1946.    J. E. CONLEY    2,405,407
RAILWAY FROG
Filed Aug. 13, 1941    3 Sheets-Sheet 3
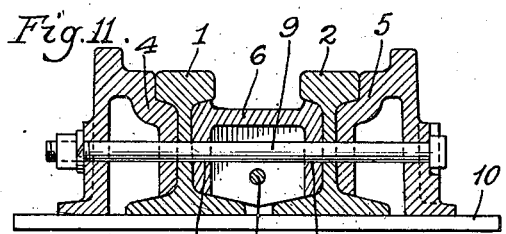
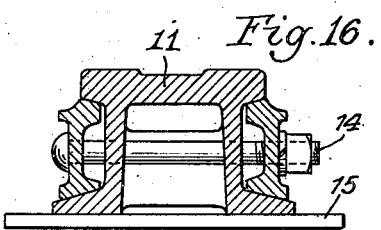
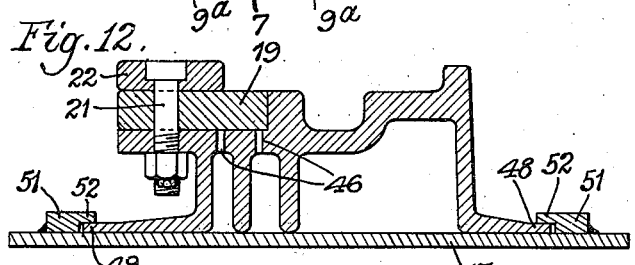
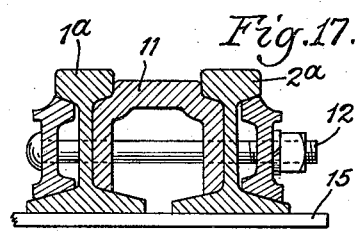
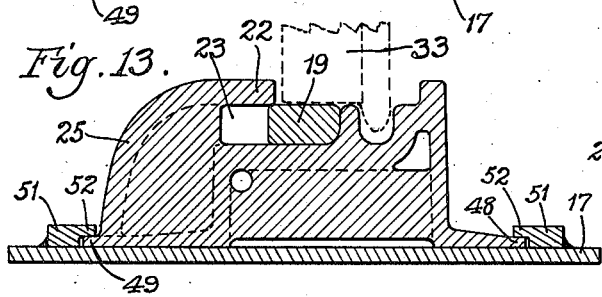
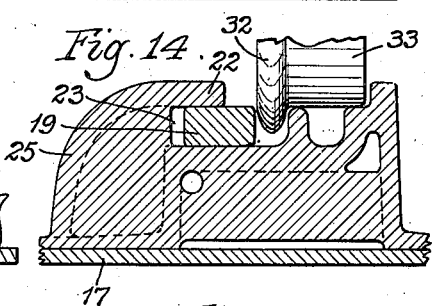
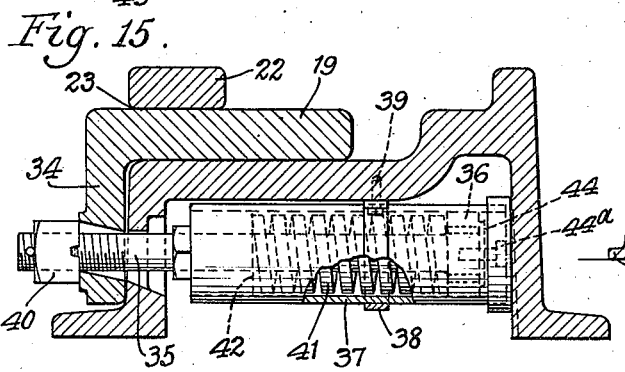
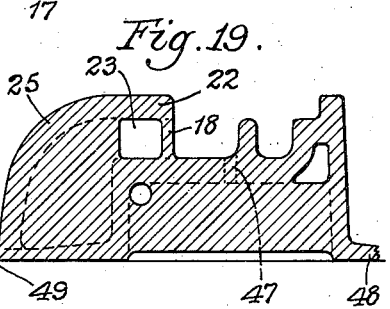
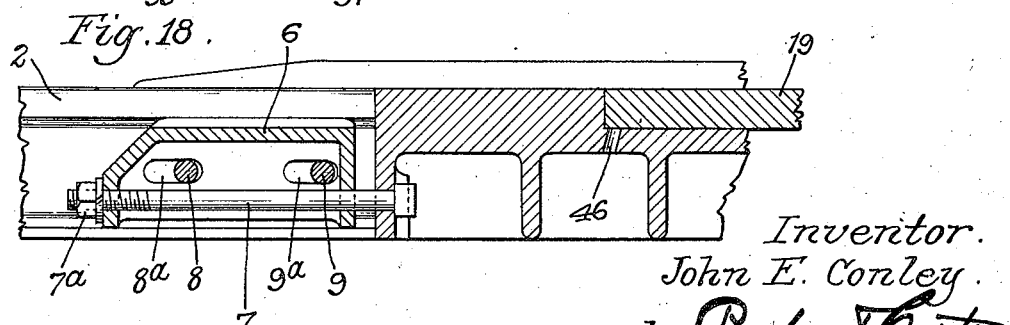
Inventor.
John E. Conley.
by Parker & Carter
Attorneys.

Patented Aug. 6, 1946

2,405,407

UNITED STATES PATENT OFFICE 2,405,407

RAILWAY FROG

John E. Conley, Memphis, Tenn.

Application August 13, 1941, Serial No. 406,619

4 Claims. (Cl. 246—471)

This invention relates to railway frogs and the process of making the same and has for its object to provide a new and improved device and process of this description.

The invention has as a further object to provide a manganese railway frog with a spring rail and the process of making the same.

The invention has as a further object to provide means in the manufacture of a spring railway frog to distribute the heat and keep the top or guard rail straight and from shearing off from the main body of the spring frog on the spring rail side. The invention has as a further object to provide in the casting of the frog heat distributing members which are removed when the frog is assembled ready for service.

The invention has as a further object to provide means to hold the spring rail down for heat treating in manufacture of the frog, so as to leave it straight after the heat treating is finished. The invention has as a further object to provide a frog with a new and improved toe block. The invention has as a further object to provide a frog with a retarder in the bottom thereof.

The invention has other objects which are more particularly pointed out in the accompanying description.

Referring now to the drawings,

Fig. 1 is a plan view of a frog embodying the invention, with rails and base plates attached;

Fig. 2 is a side elevation of the frog shown in Fig. 1, with the base plates removed;

Fig. 3 is a plan view of the frog casting before assembling, showing the ribs cast in for additional strength in casting and afterwards removed;

Fig. 4 is a plan view of the spring rail;

Fig. 5 is a side elevation of the spring rail;

Fig. 6 is a sectional view taken on line 6—6 of Fig. 1, showing the car wheel traveling on the main track;

Fig. 7 is an enlarged plan view of a portion of the frog with brace members removed;

Fig. 8 is a side view of brace member removed, shown in use in Fig. 6;

Fig. 9 is a plan view of the brace member shown in Fig. 8;

Fig. 10 is a sectional view through the brace member on line 10—10 of Fig. 6, on an enlarged scale;

Fig. 11 is a sectional view taken on line 11—11 of Fig. 1;

Fig. 12 is a sectional view taken on line 12—12 of Fig. 1;

Fig. 13 is a sectional view taken on line 13—13 of Fig. 1, showing the car wheel traveling on the main track;

Fig. 14 is a view similar to Fig. 13, showing a side track wheel crowding the spring rail aside;

Fig. 15 is a sectional view taken on line 15—15 of Fig. 1, on an enlarged scale;

Fig. 16 is a sectional view taken on line 16—16 of Fig. 1;

Fig. 17 is a sectional view taken on line 17—17 of Fig. 1;

Fig. 18 is a sectional view taken on line 18—18 of Fig. 1;

Fig. 19 is a sectional view taken on line 19—19 of Fig. 3 prior the machining;

Fig. 20 is a sectional view of the end of the piston shown in Fig. 15.

Like numerals refer to like parts throughout the several figures.

In Fig. 1 I have shown the frog with the main track rail 1 and 1a attached thereto and the side track rail 2 and 2a attached thereto. The frog is made of manganese or other hard metal capable of standing hard wear and shock, and is cast, the body portion having at one end the recess 3 into which are received the end of the main track rail 1 and of the side track rail 2, the frog being provided with the members 4 and 5 which engage the web of the main track rail and of the side track rail.

At the toe end of the frog, where rails are inserted for service, traffic conditions in time cause wear of the parts which, if not corrected, causes movement or play of the parts. To remedy this, I have provided an adjustable holding toe block 6, which is wedge shaped, having beveled sides which engage the webs of the rails. An adjusting member 7 passes longitudinally through this toe block and engages the main body of the frog at one end (Figs. 1 and 18). This adjusting member 7 has an adjustable nut 7a at the other end. Fastening devices 8 and 9 pass laterally through this adjustable block. The block is provided with elongated holes or slots 8a and 9a to permit movement of the block when it is affixed by tightening up the nut 7a.

There is a base plate 10 under the end of the frog body and the ends of the rails 1 and 2. At the other end of the frog body there is a holding block 11 between the two rails and which engages the webs thereof. Fastening members 12, 13, 14 and 14a pass through the frog body and the rails 1a and 2a to hold them in position. There are base plates 15 and 16 under the end of the frog body and the ends of the rails 1a and 2a. There are a series of base plates 17 under the frog. All of the base plates are attached to the ties.

It is essential that the contraction of the guard rail and the essential points of the metal of the frog be kept even both on the inside and the outside of the guard rail. For this purpose ribs 18 are cast in monolith with the main casting and the guard rail and other parts of the frog. These ribs keep the contraction of the metal even during casting and during the heat treating processes. These ribs insure the guard rail on the main side of the frog being kept rigid during the casting and heat treating processes. After the heat treating processes have been finished these ribs, having performed their function, are removed before the assembly of the frog for service. The frog is provided with a spring wing rail 19 which is provided with an angular piece 20 at one end (see Figs. 2, 4 and 5). This spring wing rail is held in position by a bolt 21, and has a wheel engaging beveled end.

There is a space 23 between the guard rail 22 and the body of the frog. The guard rail 22 is connected to the body of the frog by a plurality of rail braces 24, 25 and 26. The spring wing rail is placed in the space 23 between the guard rail 22 and the body of the frog. In order that the spring rail may be easily placed in position, the rail brace 26 is made removable.

The rail brace 26 is shown removed in Figs. 8 and 9. It may be of any desired construction. As herein shown, it is provided with a projection 27 which passes under the guard rail 22 (see Fig. 6) and a projection 28 which fits into a recess 29 in a part 30 integral with the main body of the frog. A bolt 31 passes through the parts 26 and 30 of this removable rail brace, as seen in Figs. 2 and 6.

When a car passes through the frog on the side track side, the beveled end of the spring wing rail 19 is engaged by the flange 32 of the car wheel (see Fig. 14) and is pressed by this flange to one side, the tread 33 of the car wheel engaging the frog, as shown in Fig. 14. When the wheel releases the spring wing rail, it is moved back to its initial position in any desired manner. Means is provided so that after the first wheel passes through the frog on the side track side, the spring wing rail will stay open a limited time so as to allow the cars of the train to pass without the continual springing back and forth of the spring wing rail. This result is secured by the following means: As herein shown, the spring wing rail is provided with a lug 34 (Figs. 4, 5) to which is attached a piston rod 35 (Fig. 15) connected with a piston 36 mounted in a cylinder 37. This cylinder 37 is attached in position in any desired manner, as by the fastening ring 38 which is fastened to the frog body by the fastening device 39. The piston rod 35 is adjustably connected with the lug 34 by the nut 40. There is a spring 41 in the cylinder 37, having one end engaging the piston 36 and the other end a fixed part 42 of the cylinder. When the wheel engages the spring wing rail and moves it, the spring 41 is compressed and when the wheel releases the spring wing rail, the spring returns it to its initial position.

A retarding device is provided for preventing the back and forth movement of the spring wing rail after each wheel releases it. One means for securing this result is by placing oil in the cylinder 37. There is a packing gland where the piston rod 35 enters the cylinder. The piston 36 has a plurality of openings 43 therein controlled by a valve 44 mounted upon a bolt 44a. These openings are comparatively large so that when the car wheel moves the spring wing rail, the valve 44 opens and the oil will quickly pass from in front of the piston to the rear thereof so as to permit a quick movement of the spring wing rail. When the oil passes to the rear of the piston, it holds the piston out and holds the spring wing rail in the position to which it is moved by the car wheel. Some means is provided to permit the oil to leak slowly past the piston to the front side of the piston under the pressure of the spring 41. Any suitable means for this purpose may be used. I have illustrated a construction where the valve 44 is provided with a small hole 45. The pressure of the spring 45a on the other side of the piston closes this valve when the piston reaches its forward position and the oil leaks slowly through this hole 45 so that the piston and the spring wing rail, after being maintained in the position to which they are moved by the car wheel, will be returned to their original position after the train has passed through the frog.

The spring wing rail is variable in length, changing with the angle of the frog and has a tight fit past the point equal to the width of the rail with which the frog is used. The removable rail brace shown in Figs. 6 and 8 is made a tight fit, and by having it attached to the part 30 integral with the body of the frog, it is held from moving back and is as effective in holding the guard rail 22 in position as if it were cast integral with the frog, and makes it possible to easily remove the spring wing rail for any purpose, and easily replace it.

As will be seen from Figs. 3 and 12, there are provided holes 46 in the body of the frog where the spring wing rail is inserted so that when the spring wing rail opens or shuts, any sand the locomotive might be dropping for traction purposes or other foreign matter will be forced out through these holes underneath the frog. There are also provided small holes 47 through the base of the throatway so that the movement of the spring wing rail will force sand out through these openings that may accumulate between the spring wing rail and the rail.

The frog is provided on opposite sides with flanges 48 and 49. Beneath these flanges are the tie plates 17 to which are attached the clips 51, which have the overlapping portions 52 (see Figs. 6 and 7). The clips 51 are shown as being welded to the tie plates although they may be fastened thereto in any desired manner. The tie plates can be thus easily attached or removed from the frog by driving them the proper distance to release the plates from the flange or base of frog 48, 49. The tie plates are fastened to the ties in the usual manner by spikes through the openings 53 and the frog is fastened to the tie plates and the ties by spikes through the openings 54.

When no train is passing over the frog, the spring wing rail is in the position shown in Figs. 1, 6 and 13, and acts as a support for the treads 33 of the wheels on the cars passing over the frog on the main track. When a car passes over the frog from the side track it must move the spring wing rail to one side to provide room for the flanges 32 of the wheels. This is accomplished by the flange of the wheel engaging the beveled end of the spring wing rail and crowding the spring wing rail to one side under the guard rail 22 (Fig. 14) so that the flange 32 of the wheel is provided with a space so as to allow the tread of the wheel to engage the proper part of the frog and prevent the cars from being derailed. The retarding device holds the spring wing rail in the position to which it is moved by the tread of the wheel on the car passing along the side track until the train passes so that the spring wing rail will not be flapping back and forth for every wheel. The retarding device is preferably so arranged as to allow an ordinary train to pass over the frog before the spring 41 returns the spring wing rail to its initial position.

It will be noted that the spring wing rail has a body portion with an angular projection at one end, provided with an opening through which the fastening device for fastening it to the frog passes and that it has a projecting lug intermediate its ends which has a hole for the spring connection, the angular projection and the lug being in planes substantially at right angles to each other.

I claim:

1. A railway frog comprising a guard rail, a main body portion, integral with said guard rail and separated therefrom by a space, a spring wing rail pivotally connected with the main body portion of the frog and working in the space between the guard rail and the main body of the frog, a spring connected with said spring wing rail for maintaining and returning the spring wing rail to its initial position, a plurality of separated freely open openings in the main body of the frog, and extending therealong, normally covered by said spring wing rail, said openings located so that the movement of said spring wing rail discharges, through said openings, foreign matter that may be in position to interfere with the movement of the spring wing rail.

2. A railway frog comprising a guard rail, a main body portion, integral with said guard rail and separated therefrom by a space, a spring wing rail pivotally connected with the main body portion of the frog and working in the space between the guard rail and the main body of the frog, a spring connected with said spring wing rail for maintaining and returning the spring wing rail to its initial position, a plurality of openings in the main body of the frog, some of the openings located near the pivoted point of the spring wing rail and other of said openings located near the free end of this spring wing rail, all of said openings normally covered by the wing rail when it is out of engagement with the wheels traveling along the frog.

3. A railway frog comprising a main body portion, a guard rail connected with the main body portion and separated therefrom by a space, a spring wing rail pivotally connected with the main body portion of the frog and working in the space between the guard rail and the main body of the frog, a plurality of spaced rail braces connecting the guard rail with the main body of the frog, one of said rail braces being removable to permit the easy insertion and withdrawal of the spring wing rail.

4. A railway frog comprising a main body portion, a guard rail connected with the main body portion and separated therefrom by a space, a spring wing rail pivotally connected with the main body portion of the frog and working in the space between the guard rail and the main body of the frog, a plurality of spaced rail braces connecting the guard rail with the main body of the frog, one or more of said rail braces being removable to permit the easy insertion and withdrawal of the spring wing rail, said removable rail brace having a projection which extends under the guard rail, an upstanding member integral with the main body of the frog, said removable rail brace having an overlapping part which overlaps said upstanding member and fastening means for connecting the overlapping part and upstanding member together to form a rigid structure.

JOHN E. CONLEY.